May 9, 1939.  J. SNEED  2,157,272
BRAKE
Original Filed Nov. 18, 1931  3 Sheets-Sheet 1
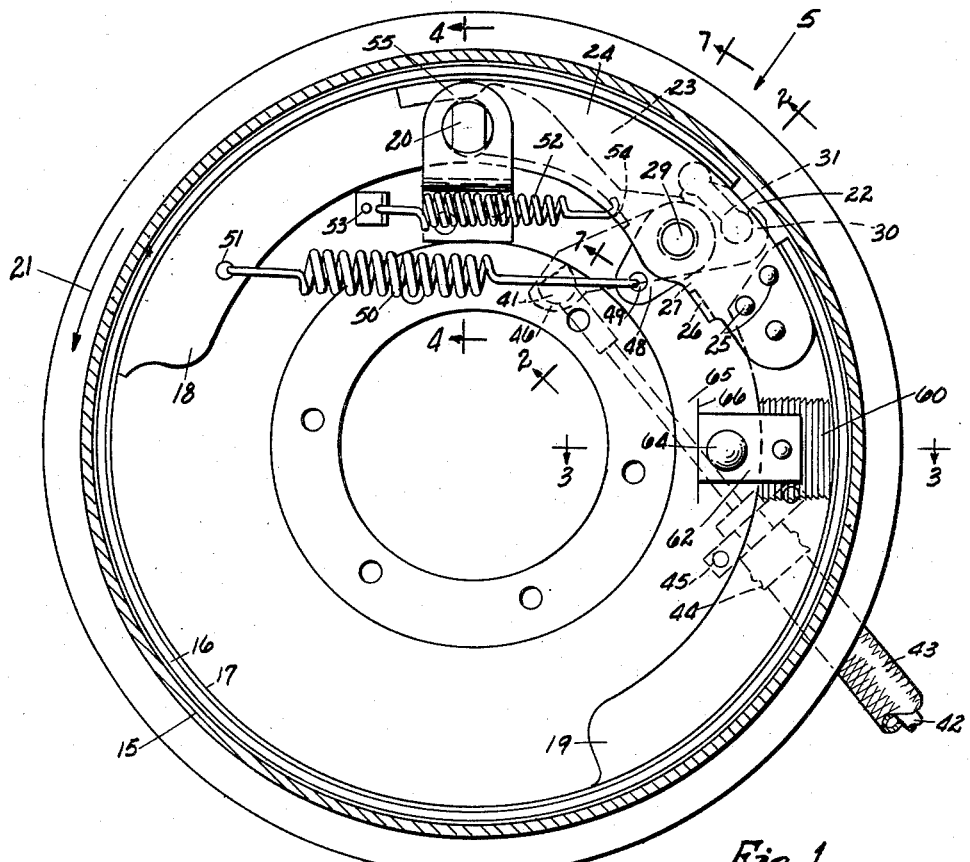
Fig. 1
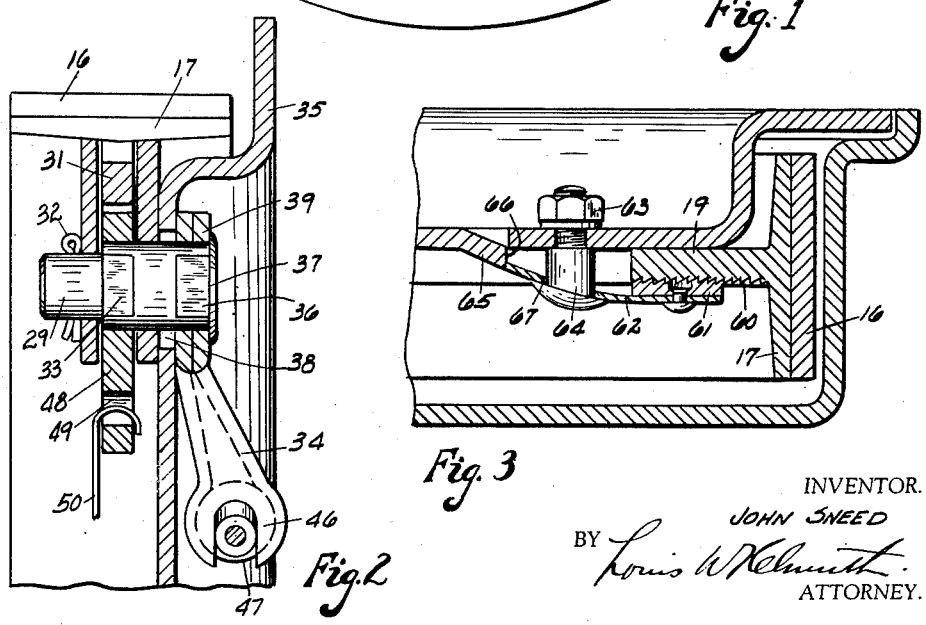
Fig. 2
Fig. 3
INVENTOR.
JOHN SNEED
BY Louis W. Kelmith
ATTORNEY.

May 9, 1939.　　　　J. SNEED　　　　2,157,272
BRAKE
Original Filed Nov. 18, 1931　　3 Sheets-Sheet 2
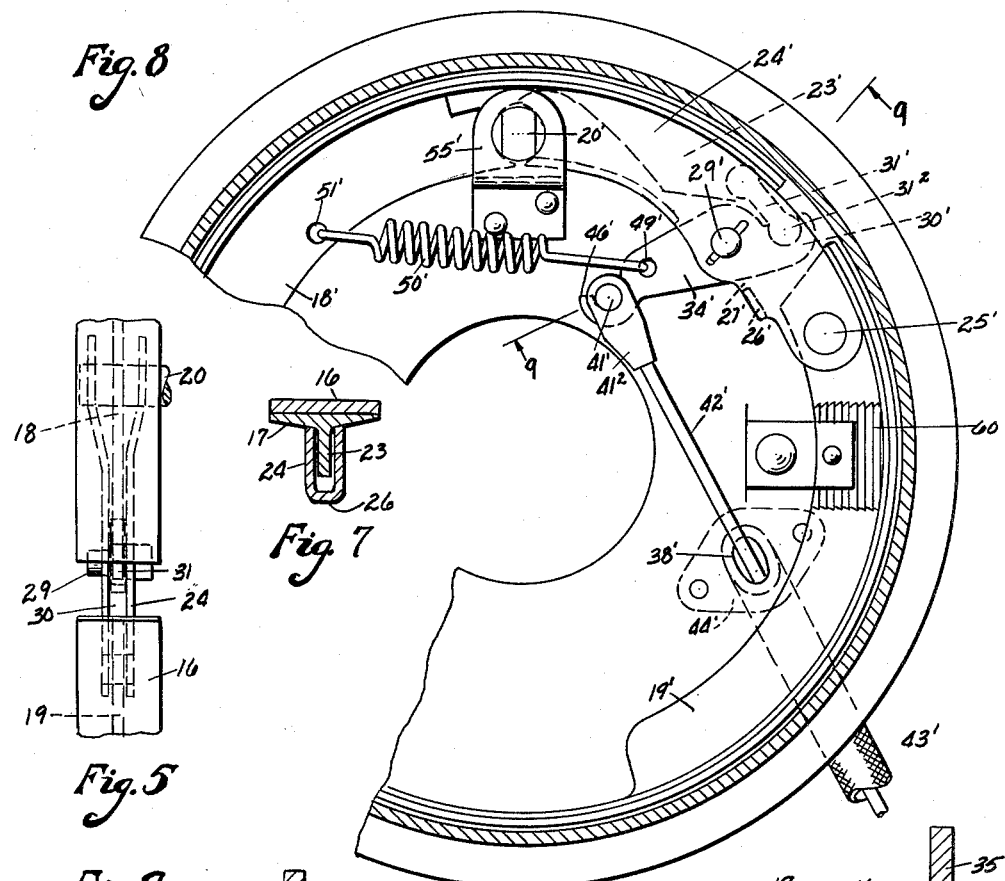
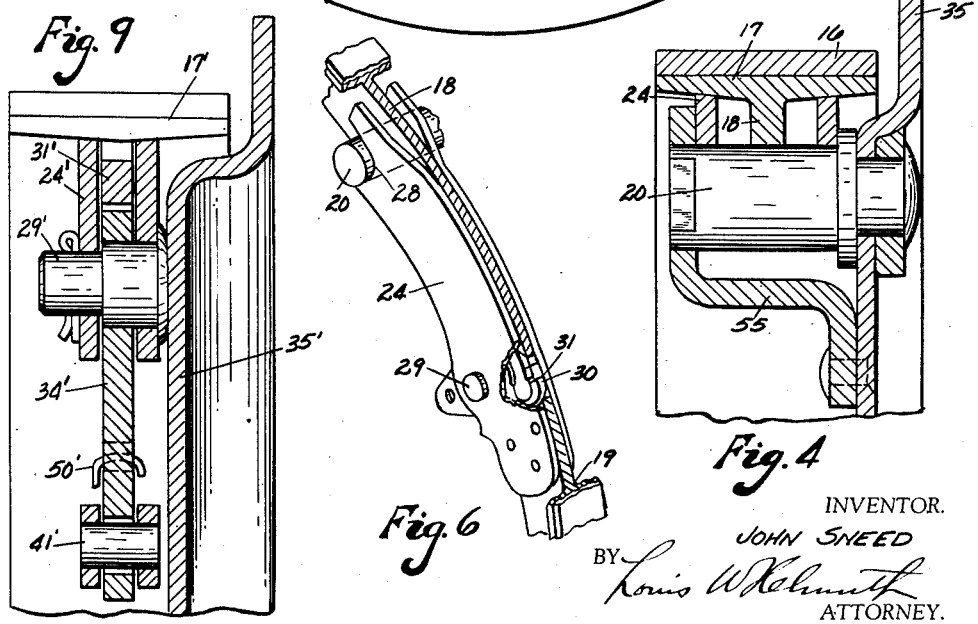
INVENTOR.
JOHN SNEED
BY Louis W. Schmidt
ATTORNEY.

May 9, 1939.     J. SNEED     2,157,272
BRAKE
Original Filed Nov. 18, 1931     3 Sheets-Sheet 3

INVENTOR.
JOHN SNEED
BY
ATTORNEY.

Patented May 9, 1939

2,157,272

UNITED STATES PATENT OFFICE 2,157,272

BRAKE

John Sneed, Grosse Pointe Shores, Mich., assignor to The Midland Steel Products Company, Cleveland, Ohio, a corporation of Ohio, trustee for Steeldraulic Brake Corporation, a corporation of Michigan Original application November 18, 1931, Serial No. 575,833. Divided and this application September 4, 1936, Serial No. 99,445

4 Claims. (Cl. 188—79.5)

This invention relates to friction brakes, and more particularly to an improved brake construction especially suitable for use upon automotive vehicles. The invention has for one of its objects provision of an improved vehicle brake, of the servo type, in which greater, more effective and more easily controllable braking force is available with the expenditure of little effort by the operator.

A further object of the invention is the provision of a friction brake of a self adjusting device furnishing means for mechanically taking up wear of the brake linings, such as is caused by continued use of the brake, thus eliminating the necessity of special adjustment for such purpose.

Another object of my invention lies in the provision of such an automatic take-up device, operable in response to ordinary utilitarian actuation of the brake, to provide automatic adjustment of the brake to compensate for wear, which device will be simple and reliable in operation and of sturdy construction.

A still further object of this invention is the provision of a brake construction, possessing the above outlined advantages, which is of simple and inexpensive construction.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a sectional elevational view taken substantially vertically through a brake incorporating one form of my invention, looking toward the brake apron.

Figure 2 is a detail sectional view taken substantially on the line 2—2 of Figure 1 and looking in the direction of the arrows.

Figure 3 is a detail sectional view taken substantially on the line 3—3 of Figure 1 and looking in the direction of the arrows.

Figure 4 is a detail sectional view taken substantially on the line 4—4 of Figure 1 and looking in the direction of the arrows.

Figure 5 is a fragmentary plan view of a portion of my preferred brake band construction, taken looking substantially in the direction of the arrow designated 5 in Figure 1, and with the brake drum removed.

Figure 6 is a fragmentary perspective view of the same portions of my preferred brake band construction, the brake lining and its supporting ring being partly broken away to afford a better view of the web construction.

Figure 7 is a detail sectional view taken substantially on the line 7—7 of Figure 1 and looking in the direction of the arrows.

Figure 8 is a sectional elevational view similar to Figure 1, but partly broken away, of a somewhat modified form of my invention.

Figure 9 is a detail sectional view taken substantially on the line 9—9 of Figure 8 and looking in the direction of the arrows.

Figure 12:
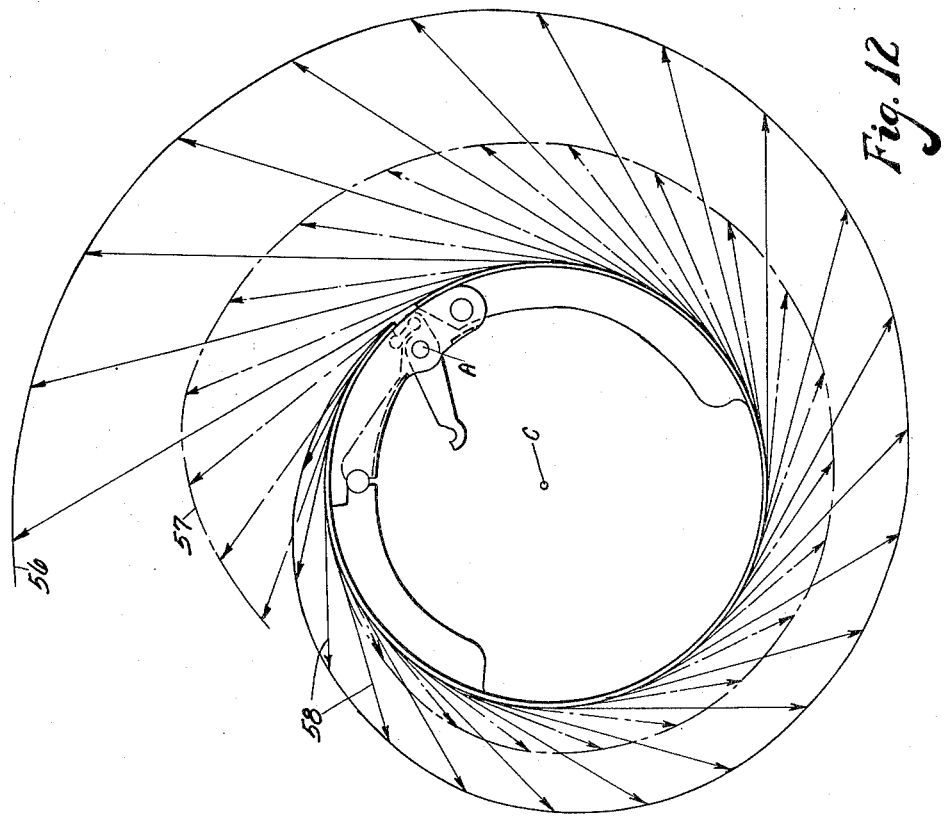
Figure 10:
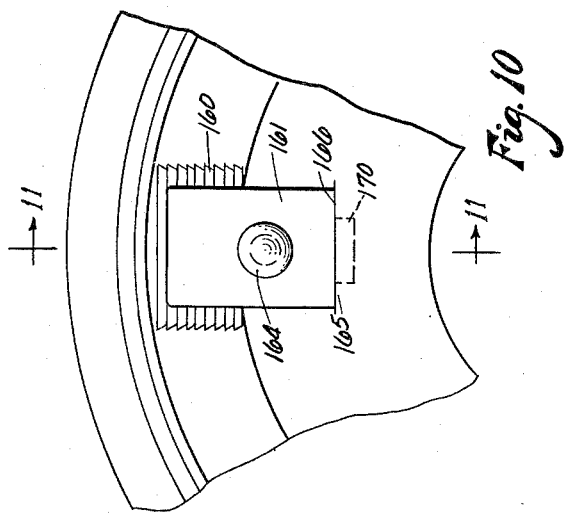
Figure 10 is a fragmentary plan view of a modified form of automatic adjusting mechanism.
Figure 11:
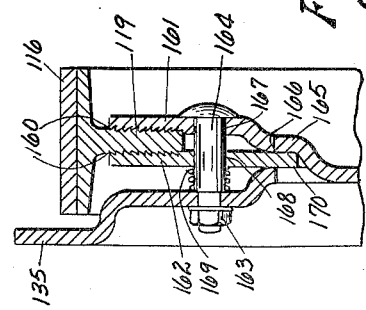

Figure 11 is a detail sectional view thereof taken substantially on the line 11—11 of Figure 10, and Figure 12 is a comparative diagrammatic representation of the proportionate braking effort obtainable by servo action with my improved brake construction, as compared to that obtainable by similar action in an ordinary self-energizing brake of efficient and well known design, having contacting braking surfaces closely approaching 360°.

This application is a division of my co-pending application for Friction brake, Serial No. 575,833 filed November 18, 1931, now Patent No. 2,054,470, assued September 15, 1936.

Referring now to the drawings: Reference character 15 indicates a brake drum, which may be of the usual or any desired construction, being here shown interiorly provided with a braking surface adapted to be contacted by brake lining 16, carried by a one-piece split annular brake band 17. The brake band is relatively flexible except where reinforced by webs, as 18—19, and is of the floating type, being limited in its rotative movement within the drum only by the anchor pin 20.

The normal direction of rotation of the drum, when the vehicle upon which it is installed is moving forwardly, is indicated by the arrow 21 (Figure 1). The webs 18—19 each carry portions adapted to abut against the anchor pin 20, the former being formed with a seat therefor which is materially spaced from the free end of the web and the nearest free end of the band. The anchor pin, and the portions carried by the webs 18—19 which seat thereagainst, are shown spaced approximately 45° from the gap 22 between the shoe ends. The configuration of the portion 23 of the web 18, which integrally extends beyond the anchor pin, is clearly shown by the longer dash lines in Figure 1.

A circumferential extension 24 is also fixedly carried by the end of the web 19 which abuts the gap 22, being shown secured thereto by rivets 25. The extension 24 of the web 19 is formed in a pair of like sections, one arranged upon each side of the web 19, to which they are secured, and of the extension 23 of the web 18, which is freely slidable between them. The sections of the extension 24 may be stamped integrally in channel form from a single piece of stock, the contour of its spaced sides being best shown in Figure 6, while its cross sectional contour is indicated in Figure 7. The web or bight portion 26 of the channeled extension 24 is punched out at the point designated 27. Aligned cut-away seat portions 28 are formed upon the ends of the side members of the extension, conforming to and adapted to normally engage the side of the anchor pin 20.

Trunnioned in the opposed sides of the extension 24 adjacent the opening 27, as upon stub shaft 29, is a lever 30, connected to the extension 23, as by the link 31. The ends of the link are enlarged and rounded in the plane of the link, which is flat, and limitedly rotatable in suitable sockets formed in the lever 30 and web extension 23, although this method of linkage is of course optional. The shaft 29 may be secured in position at its inner end by a cotter pin, 32, and the lever 30 secured upon the shaft by forming the aperture therethrough to fit flattened portions 33 of the shaft. The shaft may extend through the apron 35, and the operating lever 34 is then secured upon the outer end of the shaft, being apertured to fit over the same, and to engage flats 36 formed upon the sides of the shaft, upon which it is maintained by heading the shaft, as at 37. The aperture in the apron through which the shaft extends is designated 38, and is preferably protected against the ingress of water and other foreign matter, as by forming a portion (designated 39) of the lever 34 to overlap and cover the same.

The actuating lever 34 is also shown stamped of an integral metallic sheet, the contour to which it is drawn being clearly shown in Figures 1 and 2. Its free end will be seen to be provided with an apertured socket 46, adapted to receive the complementary half ball head 41, carried by the end of the brake actuating cable 42. The socket is slotted, as at 47, to enable free pivoting of the lever with respect to the end of the cable, when the brakes are applied and during circumferential movement of the brake band. The cable is shown protected by a conduit 43, the ferrule 44 finishing and secured to the end of which is fastened to the apron 35, as by the bracket 45. The details of construction of the cable, conduit etc., forming no part of the present invention, need not be here set forth in detail. It will be obvious moreover that my improved brake construction might readily be arranged to be operated by any other mechanical, hydraulic, electrical or other power-applying means.

Also secured upon the shaft 29 within the brake housing formed by the drum and apron, and here shown as formed integrally with the lever 30, is another lever, 48, which extends through the aperture 27 in the web 26 of the channeled extension 24. A hole 49, is punched in the end of the lever 48, for the hooked end of the stressed tensile spring 50 which engages therein. The other extremity of the spring engages an aperture 51 in the web 18. It will be seen that the spring 50 thus tends to draw inwardly both ends of the brake band, since the shaft 29 is directly supported by the web 19, being journaled in the extension 24 thereof. An additional tensile spring 52 may be utilized to draw inwardly the served end of the brake band (that carrying the web 19) with greater force than the serving end, although as will presently be explained, this is not essential. The spring 52 is shown secured at one end to a fixed supporting bracket 53, carried by the apron, and at the other to the extension 24 of the web 19, by insertion of its hooked end in a punched aperture 54 in the channel web 26.

When the brakes are applied, as by means of a brake pedal or lever, (not shown) a draw upon the cable 42 results. The portion of the brake band carried by the web extension 23 is first moved into contact with the drum, by the above described lever and linkage mechanism. Rotation of the drum applies a tangential force to the brake band, which is transmitted therearound causing a "piling up" action, and a constantly increasing radial force which urges the band against the drum. The building up of the radial component of the force thus generated is limited at the farther end of the brake shoe by the web 19, to prevent undesirable "grabbing" of the drum by the shoe.

The generation of radial thrust is relatively smooth and gradual at the serving (first applied) end of the band, but accelerates so rapidly as the served end is approached as to render desirable the utilization of some such stiffening web as 19. It is unduly rapid generation of radial thrust which is undesirable, however, not the evolution of too great force. If, therefore, the entire force possible to be thus generated could be produced sufficiently gradually, it could be effectively utilized and controlled. The arrangement of the parts of my improved brake construction will be seen to be such that a greater percentage of such radial braking force is built up at the serving end of the brake shoe—relatively slowly—thus furnishing a greater useful braking effort by prolonging the period in which the radial thrust is gradually built up. In the structural embodiment just described, the serving action commenced approximately 45° in advance of the anchor pin, and is then transmitted around the brake shoe to the web 19, the portion of the brake band carrying which moves as a unit into engagement with the drum.

Figure 12 diagrammatically indicates the comparative functioning of a self-energizing brake incorporating a band construction of my improved type, as compared with the more usal servo acting internal expanding brake band in which the applying means is positioned at the anchor pin, rather than in advance thereof as in my improved construction. The relative braking effort generated at any given point along the band is in one instance represented by the radial distance between the center C and the line 56, and in the other by the radial distance to the line 57. The full line 56 represents the braking effort generated in a brake of my improved construction, while the dot-dash line 57 comparatively indicates that developed by the band of an ordinary brake of the self-energizing type. As shown in this figure, in my improved brake the force begins to build up substantially at the point (A) at which the serving end of the band is moved into engagement with the drum. The tangential force subsequently imposed upon the band by rotation of the brake drum is indicated by arrows 58. The braking effort constitutes the radial component, and as pointed out above, is indicated by the line 56. In the herein disclosed improved construction, by the time the transmitted thrust has reached the anchor pin, it has already attained considerable magnitude by relatively gradual accumulation. The force generated by the ordinary servo actuating band however, must travel well around toward the served end before it attains similar proportions, at which point it tends to increase too sharply, and must be restricted to prevent undesirable "grabbing." The tangential direction of the motivating force furnished by the rotating drum will be seen to be largely responsible for the relatively slow increase of radial thrust adjacent the point of beginning, and it will be similarly observed that in my new construction this radial thrust is nevertheless given considerably greater initial extent in which to develop relatively slowly.

In Figures 8 and 9 I have shown a somewhat modified construction in which the actuating cable is conducted into the interior of the drum, as through the angularly flanged nipple 44' and the aperture 38' in the apron. In this construction the single lever 34' is integrally extended, as at 30', for connection by means of the link 31' to the web extension 23'. The construction of the stub shaft 29' upon which the lever is journaled in this embodiment is best shown in Figure 9, and the spring 50' is directly secured thereto, as by hooking its end in the aperture 49' therein. Its other end is secured to the web 18', as through the aperture 51' therein. It is not necessary, in order to insure movement of the portion of the brake band carrying the web portion 23' into engagement with the brake drum first, to utilize any other springs than the spring 50', as the inward draw which it exerts upon the web portion 19' is reduced by the tendency of the lever to pivot about the cross pin 41' carried by the end of the cable, and also by the length of the lever 34', while the force which it exerts upon the web 18' is directly and fully effective.

Upon applying the brake, the spring 50' continues to draw inwardly the served end of the band, since the lever pivots about its connection with the cable, and the spring therefore tends to swing the lever 34' to the left as viewed in Figure 8, about the axis of the pin 41' which provides the pivotal connection between the end of the cable and the hooked extremity 46' of the lever. The extension 24' is thus held against the anchor pin 20' while the web portion 18' is being moved outwardly. The pin 41' transverses the ends of the clevis 41², which is secured to the end of the cable 42'. The lever 34' swings about the stub shaft 29', and the integral lever portion 30' urges the section 23' of the band into engagement with the drum. The shaft 29' meanwhile remains substantially fixed in position, and the extension 24' remains seated against the anchor pin 20' under the influence of the spring 50' until the section 23' has contacted the drum, after which continued drawing upon the cable tends to pivot the lever about the end 31² of the link 31'; while the pin 25' forces the served end of the brake shoe toward the drum. In this embodiment it will also be observed that the extension portion 24' is shown pivotally rather than rigidly secured to the web 19', as by means of the pivot pin 25'. The construction of these parts may otherwise be similar, however.

In both embodiments, additional support is shown provided for the anchor pin, comprising a bracket (55—55'), the construction of which is clearly shown in Figures 1, 4 and 8.

To provide automatic take-up means adapted to compensate for wearing away of the brake lining, and automatically adjust the brakes, I may employ the constructions shown in Figures 1, 3, 8, 10 and 11, in one form of which a series of ratchet teeth 60 are provided upon the outer face of the web 19—19'. The block 61, formed with complementary ratchet teeth, is yieldably urged laterally against the ratchet teeth 60 by its spring metal supporting member 62, as shown in Figure 3. The supporting member 62, is stiff enough, however, to resist inward movement of the web 19 with sufficient firmness. The spring member 62 is supported by means of the nut and bolt 63—64, and its rear edge normally seats against the laterally struck-up portion 65 of the apron, which is formed with a straight locating edge 66 for such purpose. The aperture 67 in the spring metal supporting member 62 is slightly larger than the stem of the bolt 64, as shown in Figure 3, so that the support and the block 61 may move outwardly a slight distance upon outward movement of the web 19, when the brake is applied. They of course return to the inward limit of their movement when the brake band is indrawn by the shoe-retracting springs. The ratchet teeth are of such size and so arranged that the outward movement of the ratchet toothed section 60 relatively to the block 61, upon application of the brake, is through a distance less than the length of one ratchet tooth. Thus, ordinary application of the brake does not cause the ratchet portions to "climb" a tooth. When the lining 16 has worn sufficiently, however, to permit the web 19 to mount one tooth with relation to the block 61, it will do so, upon a full application of the brake. The band will then recede from the drum a distance equal to the difference in the diameters of the stem of the bolt 64 and the aperture 67 in the spring-supporting member 62, or until the rear edge of the supporting member strikes the positioning edge 66, thus providing sufficient clearance, and preventing dragging of the brake band.

The described automatic adjusting mechanism may also serve as a centering stop for the entire brake band, to prevent the same from swinging to the left, as viewed in the drawings, about the anchor pin 20, which it would do under the influence of the shoe-retracting spring or springs, which, as above explained, exert greater tension upon the served end of the band. Separate or additional centering means might of course be provided if desired, but since these form no part of my present invention they need not herein be further considered.

A somewhat modified form of automatic wear-adjusting take-up is shown in Figures 10 and 11, in which, as shown, ratchet teeth 160 are formed upon each side of the web 119, preferably in substantially aligned opposed relation and upon an area located at the served end of the band. Complementarily toothed plates 161—162 engage the teeth upon each side of the web, both being supported by the bolt 164, which is secured by a nut 163, and provided with apertures 167—168 through which the bolt stem passes. The apertures are preferably slightly larger than the stem of the bolt. The compression spring 169, encircling the stem of the bolt, urges the plate 162 against the toothed section of the web 119. The other end of the spring bears outwardly against the apron 135. The inner edge of the plate 161 bears inwardly against the straight locating edge 166 of the struck-out portion 165 of the apron, which portion will be seen to be struck out a sufficient distance to enable insertion of the teat 170 in the aperture thus formed.

The operation of this form of my self-adjusting mechanism will be seen to be similar to that of the first described embodiment. The plates 161—162 travel outwardly with the web 119 a slight distance upon application of the brake, to enable a slight clearance providing return movement of the band in event the ratchet sections "climb" a tooth. The teeth are here also preferably slightly longer than the radial distance traveled by the band in a normal brake application, so that the band ordinarily returns to the same position, until the lining 116 has worn away sufficiently to cause the automatic taking up of another tooth in the described manner.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In a friction brake, a brake drum, a backing plate having a struck out portion, a brake shoe, means for moving the shoe into engagement with the drum to apply the brake, braking surfaces carried by the drum and shoe, means normally yieldably holding the shoe away from the drum to maintain the brake in released position, and automatic adjusting means to compensate for wearing away of the braking surfaces, comprising a ratchet toothed portion carried by the shoe, a detent block yieldably cooperatively engaging the ratchet teeth and abutting said struck out portion to limit movement of the shoe away from the drum but not its movement theretoward, the shoe and ratchet section carried thereby being movable relatively to the detent block upon normal application of the brake, through a distance less than the effective distance between successive ratchet teeth whereby upon release of the brake shoe after application thereof it may ordinarily return to its initial position, but upon sufficient wearing away of the braking surface, the shoe carried ratchet section advances a tooth relatively to the detent member, which thereby prevents complete return of the shoe to its initial position upon release thereof.

2. In a friction brake, a brake drum, a backing plate having a struck out portion, a brake shoe having a radial flange, means for moving the shoe into braking engagement with the drum, braking surfaces carried by the drum and shoe, means yieldably holding the shoe away from the drum to normally maintain the brake in released position, and automatic adjusting means to compensate for wearing away of the braking surfaces, comprising a ratchet toothed section formed on said flange, a detent block engaging the ratchet teeth and engaging the struck out portion to limit movement of the shoe away from the drum but not its movement theretoward, the shoe and ratchet section being movable relatively to the block upon an ordinary application of the brake, through a distance less than the effective distance between successive ratchet teeth whereby upon release of the brake shoe after application thereof it may ordinarily return to its initial position, but upon sufficient wearing away of the braking surfaces, the shoe-carried ratchet section advances a tooth relatively to the detent member, which thereby prevents complete return of the shoe to its initial position, and a stud secured to the backing plate and extending through the block with clearance for allowing a relatively slight return movement of the shoe after such advance of the ratchet, to prevent dragging of the shoe upon the drum.

3. In a friction brake, a brake drum, a backing plate, a brake shoe having a radial flange engaging said backing plate, means for moving the shoe into engagement with the drum to apply the brake, braking surfaces carried by the drum and shoe, means normally yieldable holding the shoe away from the drum to maintain the brake in released position, and automatic adjustment means to compensate for wearing away of the brake surfaces, comprising a ratchet toothed portion formed on said radial flange, a detent plate substantially parallel to the backing plate and having one end engaging the ratchet piece and its opposite end abutting the backing plate to limit movement of the shoe away from the drum but not its movement theretoward, a bolt secured to the backing plate and extending with clearance through said detent plate causing it to resiliently engage the radial flange of the shoe and the backing plate, the shoe and ratchet portion carried thereby being movable relatively to the detent plate upon normal application of the brake through a distance less than the effective distance between successive ratchet teeth whereby upon release of the brake shoe after application thereof it may ordinarily return to its initial position, but upon sufficient wearing away of the brake surface, the shoe carried ratchet portion advances a tooth relatively to the detent plate, which thereby prevents complete return of the shoe to its initial position upon release thereof.

4. In a friction brake, a brake drum, a backing plate having a struck out portion defining a recess, means for moving the shoe into engagement with the drum to apply the brake, braking surfaces carried by the drum and shoe, means normally yieldably holding the shoe away from the drum to maintain the brake in release position, and automatic adjusting means to compensate for wearing away of the braking surfaces, comprising a radial portion of the shoe provided with ratchet teeth on opposite sides thereof, a pair of detent plates engaging said ratchet teeth, one of said plates abutting said struck out portion to limit movement of the shoe away from the drum but not its movement theretoward, the other plate having one end received in said recess, a bolt extending with clearance through said plates causing them to engage the radial portion of the shoe, said bolt being secured to said backing plate and being provided with a spring between said backing plate and last named detent plate, the shoe and ratchet section carried thereby being movable relatively to the detent plates, upon application of the brakes through a distance less than the effective distance between successive ratchet teeth whereby upon release of the brake shoe after application thereof, it may ordinarily return to its initial position, but upon sufficient wearing away of the braking surfaces, the shoe carried ratchet section advances a tooth relatively to the detent member which thereby prevents complete return of the shoe to its initial position upon release thereof.

JOHN SNEED.